(12) United States Patent
Sunderland

(10) Patent No.: US 8,452,324 B2
(45) Date of Patent: May 28, 2013

(54) CUSTOMISABLE MOBILE COMMUNICATION DEVICE

(75) Inventor: Thomas Sunderland, London (GB)

(73) Assignee: CyCell Limited (GB)

( * ) Notice: Subject to any disclaimer, the term of this patent is extended or adjusted under 35 U.S.C. 154(b) by 76 days.

(21) Appl. No.: 13/156,127

(22) Filed: Jun. 8, 2011

(65) Prior Publication Data

US 2012/0009974 A1 Jan. 12, 2012

(30) Foreign Application Priority Data

Jun. 10, 2010 (GB) .................................. 1009734.3
Nov. 23, 2010 (GB) .................................. 1019855.4

(51) Int. Cl.
*H04W 88/02* (2009.01)

(52) U.S. Cl.
USPC .................................................. 455/550.1

(58) Field of Classification Search
USPC ...................................................... 455/550.1
See application file for complete search history.

(56) References Cited

U.S. PATENT DOCUMENTS

| | | | |
|---|---|---|---|
| 6,744,890 B1 | 6/2004 | Le et al. | |
| 7,174,176 B1 * | 2/2007 | Liu | 455/462 |
| 2001/0041582 A1 | 11/2001 | Pan | |
| 2007/0087756 A1 * | 4/2007 | Hoffberg | 455/450 |
| 2008/0150769 A1 | 6/2008 | Imamura | |
| 2011/0065400 A1 * | 3/2011 | Teikari et al. | 455/129 |

FOREIGN PATENT DOCUMENTS

| | | |
|---|---|---|
| EP | 0093509 A1 | 11/1983 |
| WO | 01/75580 A2 | 10/2001 |
| WO | 01/75580 A3 | 10/2001 |
| WO | 03/036922 A2 | 5/2003 |
| WO | 03/036922 A3 | 5/2003 |

OTHER PUBLICATIONS

UK Search Report for priority application GB 1009734.3, dated Sep. 9, 2010.
UK Search Report for priority application GB 1019855.4, dated Sep. 30, 2011.

* cited by examiner

*Primary Examiner* — Diane Mizrahi
(74) *Attorney, Agent, or Firm* — Andrus, Sceales, Starke & Sawall, LLP

(57) ABSTRACT

A mobile communication device comprises a handset having a transmitter; a control circuit for controlling mobile communications via the transmitter, the control circuit including a processor; and a customizable keypad arrangement including at least one key for initiating mobile communications. The keypad arrangement comprises a board having on one surface an array of metallic switch nodes respectively capable of being rendered active or inactive according to an output of the processor. The processor is programmable or programmed in dependence upon a desired keypad layout to render active a selected one or ones amongst the metallic switch nodes. A keypad assembly is mounted on the board and provided with at least one switch element situated to overlie the said selected metallic switch node(s) and operable by said at least one key for initiating mobile communications.

18 Claims, 17 Drawing Sheets

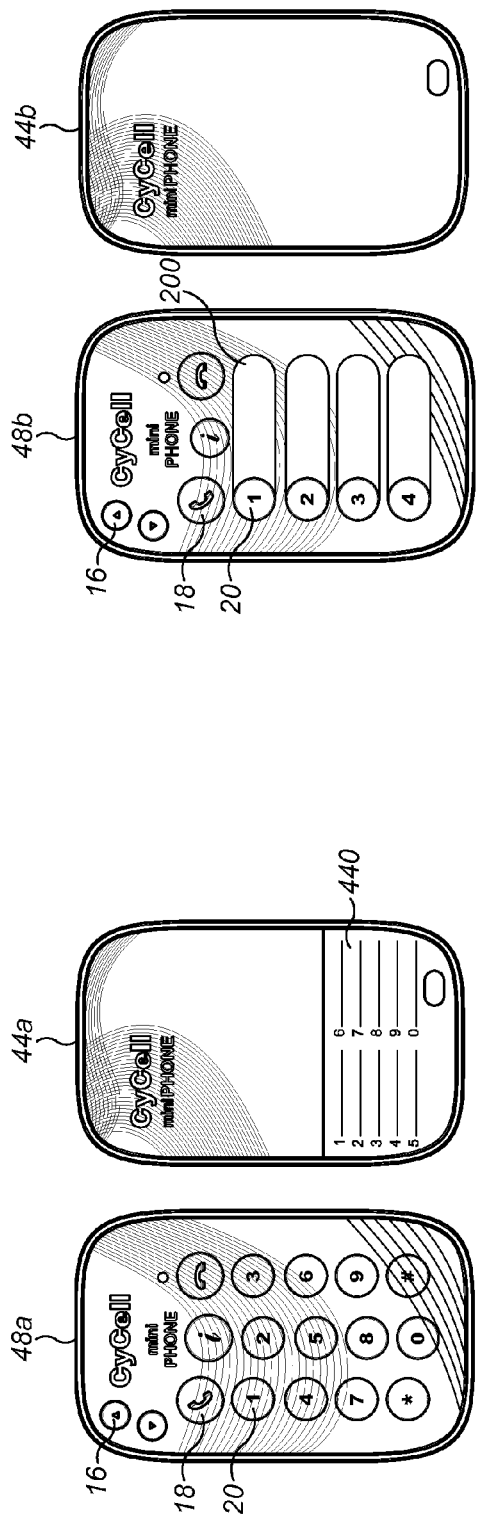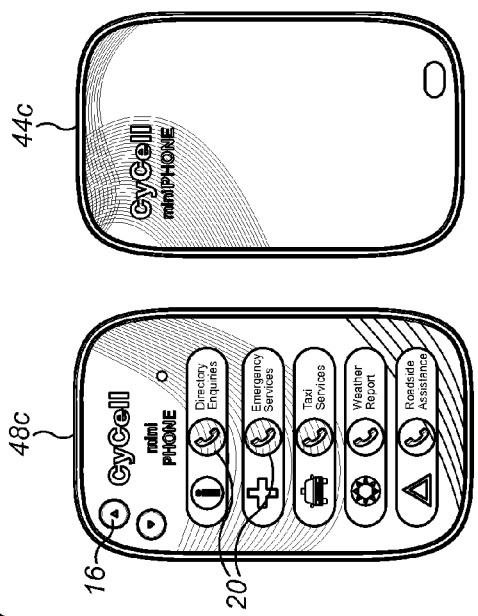
FIG. 10(a)
FIG. 10(b)
FIG. 10(c)

CUSTOMISABLE MOBILE COMMUNICATION DEVICE

CROSS-REFERENCE TO RELATED APPLICATIONS

The present application claims priority to and the benefit of British Patent Application No. 1009734.3, filed on Jun. 10, 2010, and British Patent Application No. 1019855.4, filed on Nov. 23, 2010, the disclosures of which are hereby incorporated in entirety herein by reference.

BACKGROUND

The present invention concerns a mobile communication device, having a keypad arrangement with a customisable key layout that may be adapted to suit the operating requirements of the end user.

Modular communication devices are known including a removable keypad fascia or module, which can be exchanged for a different keypad fascia or module in order to alter the appearance of the communication device. Accordingly, such conventional devices may have a decorative appearance that is variable to please the user.

SUMMARY

The present invention seeks to provide a much more versatile mobile communication device that has customisable functions and that is at the same time simple to produce and use.

According to the present invention, there is provided a mobile communication device comprising a handset having a transmitter; a control circuit for controlling mobile communications via the transmitter, the control circuit including a processor; and a customisable keypad arrangement including at least one key for initiating mobile communications, the keypad arrangement comprising a board having on one surface an array of metallic switch nodes respectively capable of being rendered active or inactive according to an output of the processor, the processor being programmable or programmed in dependence upon a desired keypad layout to render active a selected one or ones amongst the metallic switch nodes, and a keypad assembly mounted on the board and provided with at least one switch element situated to overlie the said selected metallic switch node(s) and operable by said at least one key for initiating mobile communications.

Preferably, the keypad assembly comprises a switch layer carrying a plurality of switches overlying a selected plurality of metallic switch nodes, and a keypad layer including a corresponding plurality of keys arranged to overlie the selected plurality of metallic switch nodes.

In a preferred form of the invention, the mobile communication device has a modular design comprising a series of switch layers and/or keypad layers selectable according to the desired keypad layout. For example, there may be a plurality of templates for the keypad assembly, which are respectively selectable according to the desired keypad layout.

Advantageously, each metallic switch node may comprise first and second metallic elements separated by an insulating gap, and each switch element may comprise a resiliently depressible conductive member arranged when depressed by manual pressure to connect the two metallic elements. For example, the first element may be a metallic dot, the second element may be a metallic ring surrounding said metallic dot, and the conductive member may be a domed plate.

BRIEF DESCRIPTION OF THE DRAWINGS

The invention will be described further, by way of example, with reference to the accompanying drawings, in which:

FIG. 10 shows front and rear views for various examples of the mobile communication device, customised by selection of different keypad layouts and rear labels from a modular series of keypad assemblies and rear labels.

DETAILED DESCRIPTION OF THE DRAWINGS

Figure 1:
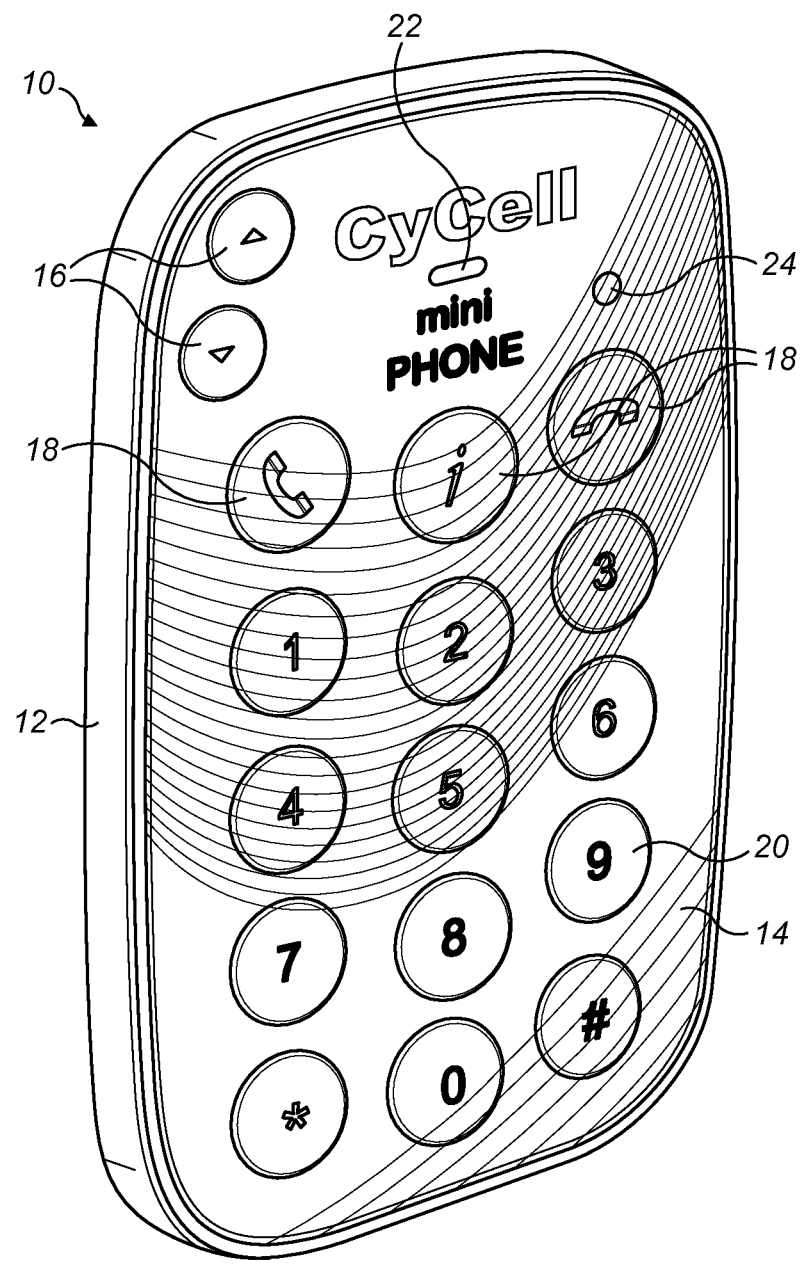
FIG. 1 is a front perspective view of a mobile communication device according to the present invention.
Figure 2:
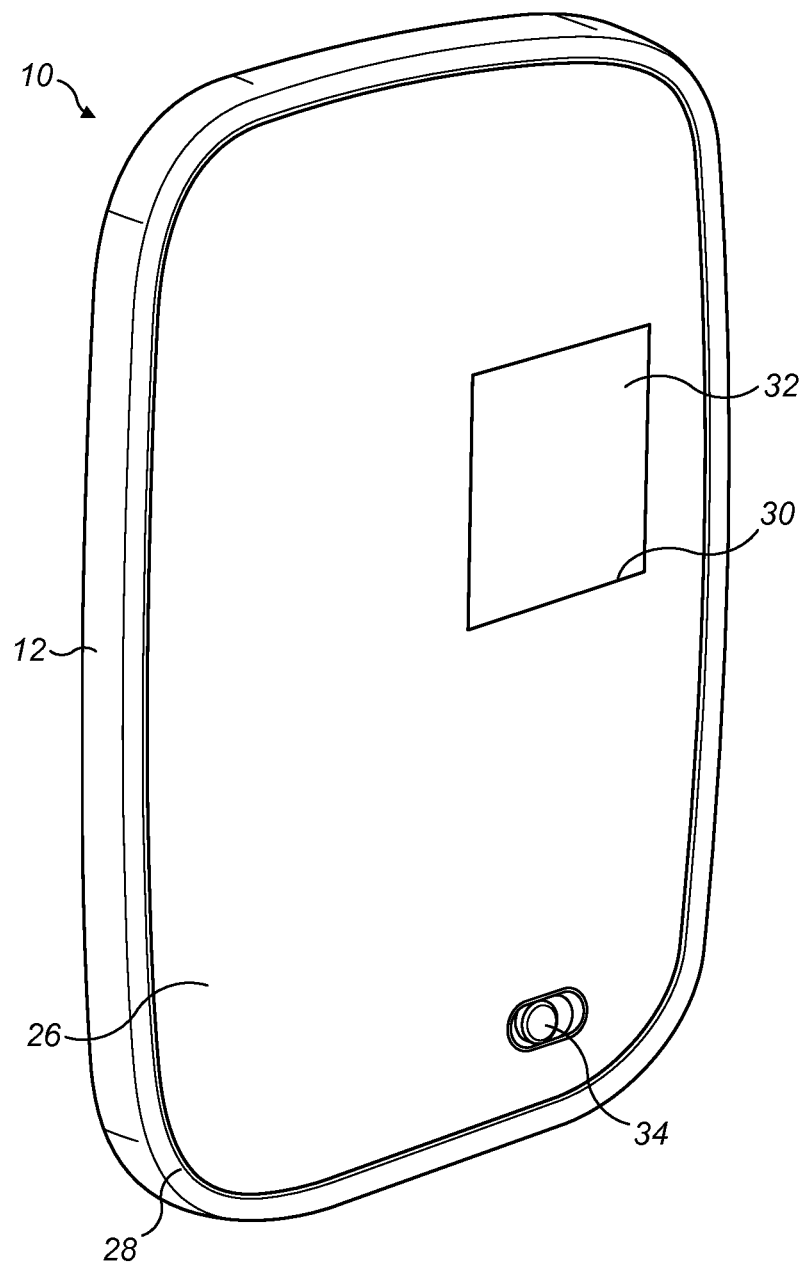
FIG. 2 is a rear perspective view of the mobile communication device.

Referring now to the drawings, FIGS. 1 and 2 show a mobile communication device according to the present invention having a handset 10 in the form of a slim housing 12 approximately the size of a credit card. The housing 12 has a front face 14 including a customised keypad layout, which in the present instance comprises a pair of volume keys 16, a series of three function keys 18 for initiating and terminating mobile communications and for providing a menu, and a series of twelve alphanumeric keys 20 comprising the numerical keys 0 to 9 as well as a star key and a hash key. The front face 14 also includes a speaker slot 22 and a small LED window 24 that becomes illuminated when power is switched on. The housing 12 also has a rear face 26 formed with an upstanding perimeter wall 28, a SIM card opening and hatch 30, 32 and an on/off power switch 34.

The construction of the mobile communication device 10 will be described further with reference to FIGS. 3 to 8.

Figure 3:
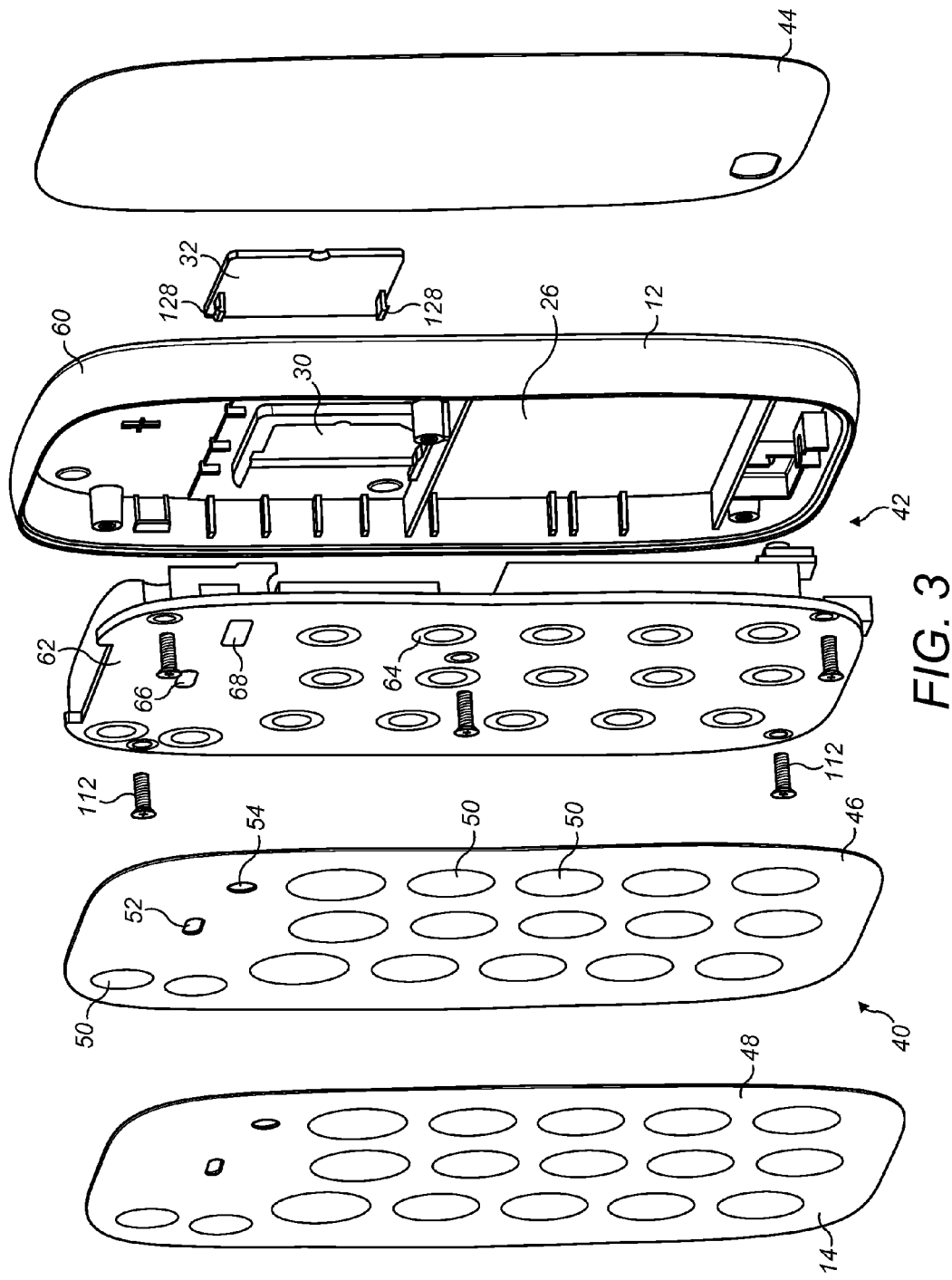
FIG. 3 is an exploded view of the mobile communication device.

FIG. 3 shows an exploded view of the mobile communication device comprising a keypad assembly 40 providing the front face 14 of the housing 12, a basic housing body 42 containing the circuit elements of the mobile communication device, and an adhesive rear label 44 arranged to overlie the rear face 26 of the housing 12 and to sit flush with the raised outer surface of the perimeter wall 28.

The keypad assembly 40 includes two layers, namely a switch layer 46 and a keypad layer 48. The switch layer 46 comprises a plurality of domed switch elements 50, one corresponding to each of the keys 16, 18, 20 of the communication device as described with reference to FIG. 1. Each domed switch comprises a small flexible dome 50a having a metallised concave undersurface 50b. Each such dome is depressible under finger pressure to make electrical contact with and close an underlying switch, as described below. The switch layer 46 also includes a speaker slot 52 and an LED window 54, which slot 52 and window 54 are arranged to be aligned with the speaker slot 22 and the LED window 24.

The keypad layer 48 is flexible and includes the keys 16, 18, 20 as described with reference to FIG. 1, as well as the speaker slot 22 and the LED window 24. As can be seen, the keys 16, 18, 20 and the domed switch elements 50 are situated to be aligned with and overlie one another, so that finger pressure applied to any one of the keys depresses and operates a corresponding one of the domed switch elements 50.

The switch layer 46 and the keypad layer 48 are of modular design, being selectable from amongst a series of such layer components according to the functional or operating requirements of the user, as will be described below. The layout of the domed switch elements 50 on the switch layer 46 and the layout of the keys on the keypad layer 48 are thus selectively variable according to the choice of component in each instance, in order to match a desired keypad layout and design for the face 14.

Figure 4:
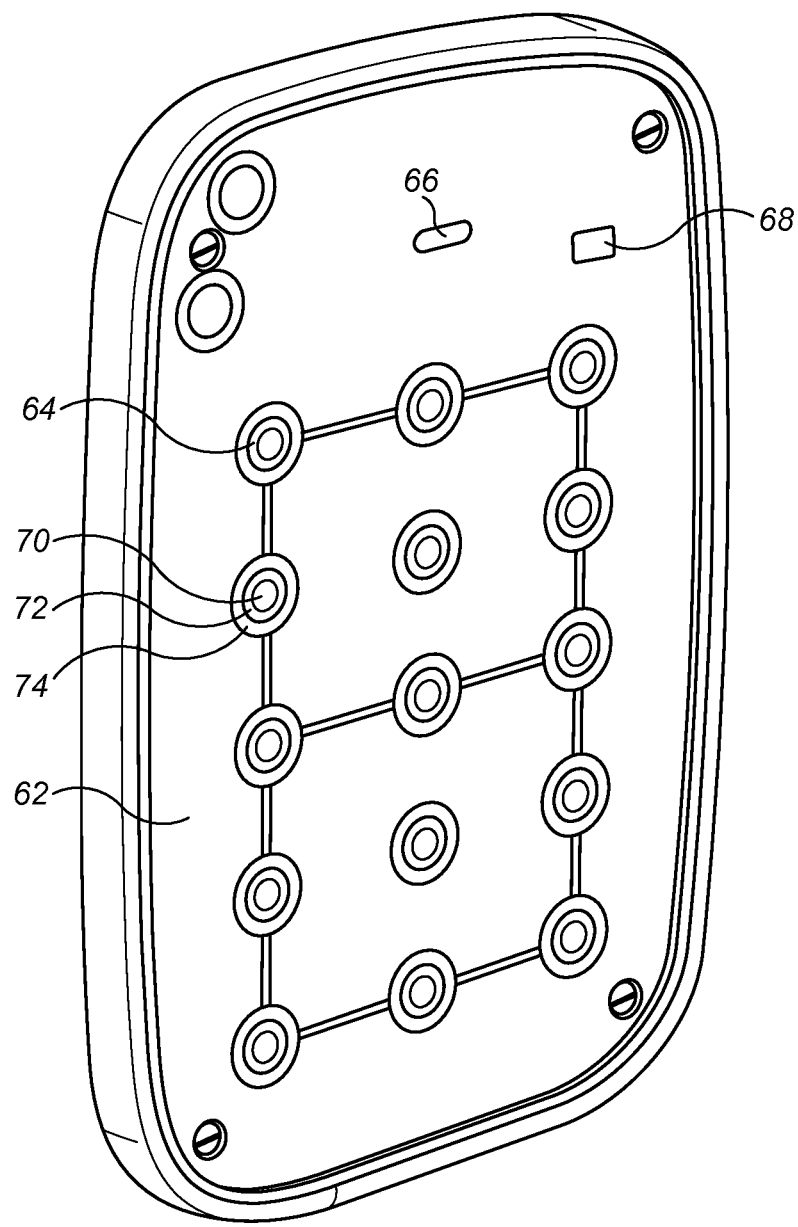
FIG. 4 is a front perspective view of a basic housing of the mobile communication device showing a front plate thereof including an array of switch nodes.
Figure 5:
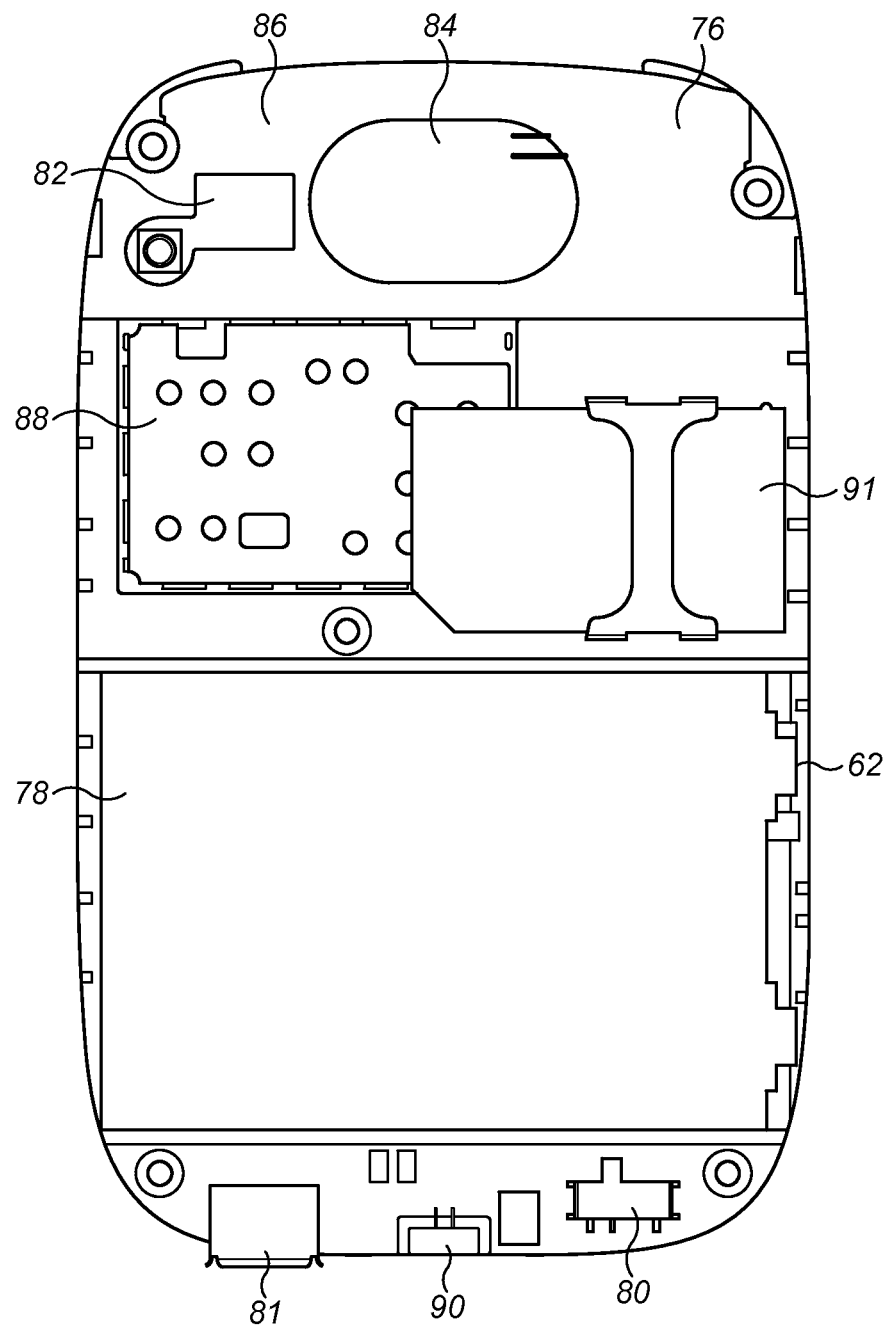
FIG. 5 is a rear view of a printed circuit board forming the front plate of the housing of FIG. 4.
Figure 6:
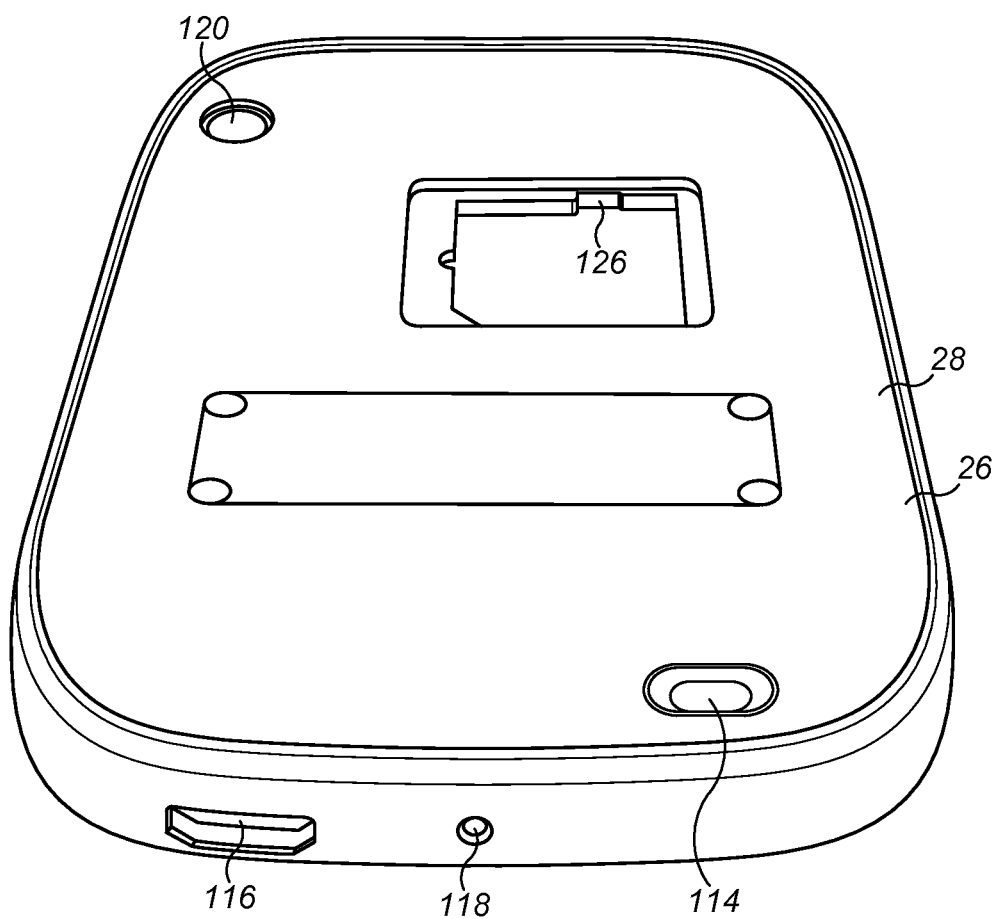
FIG. 6 is a perspective view of a base or rear wall of the housing of FIG. 4 from the outside, including an opening for receiving a subscriber identity module (SIM) card hatch.
Figure 7:
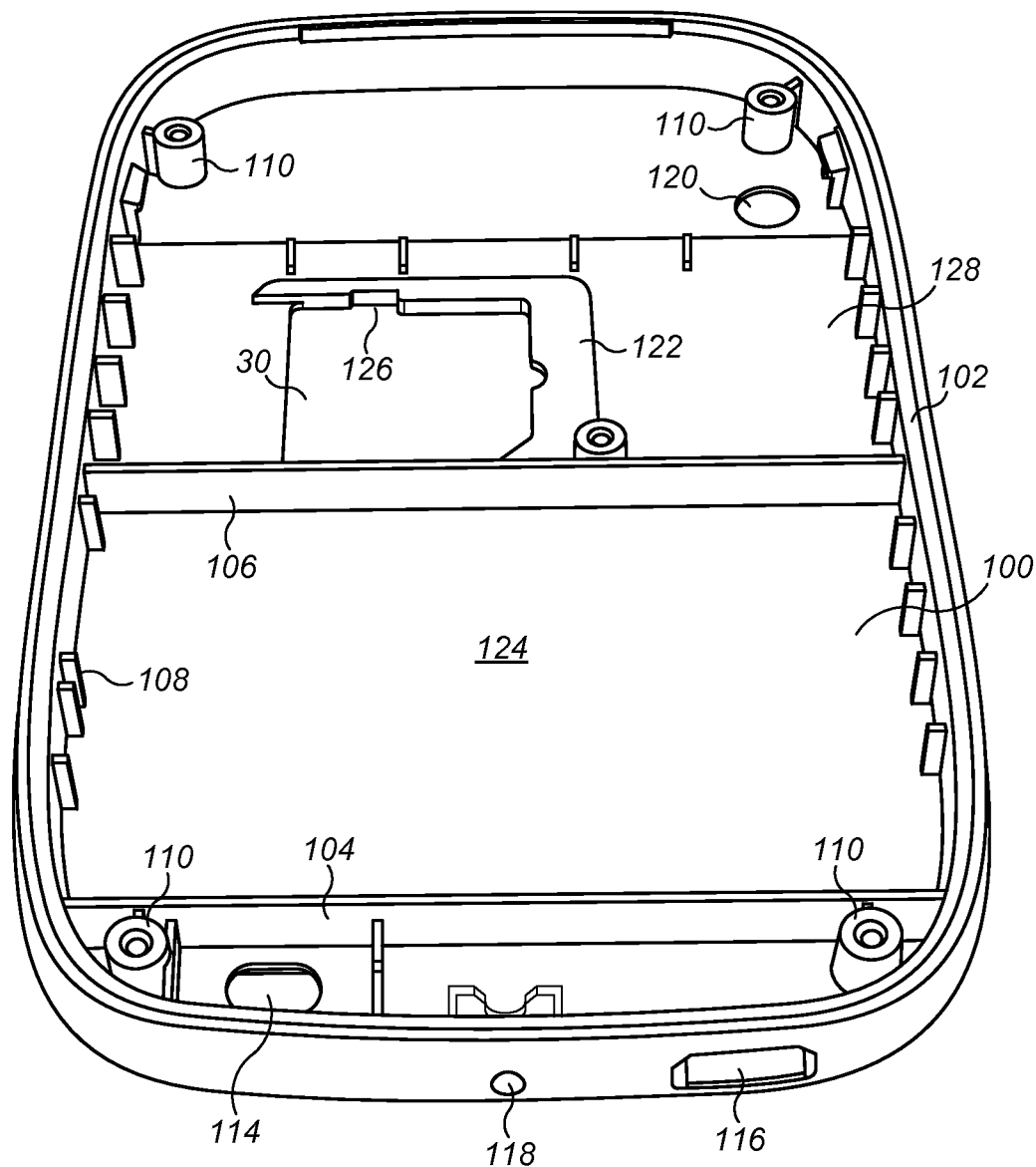
FIG. 7 is a perspective view of the internal surface of the base wall.
Figure 8:
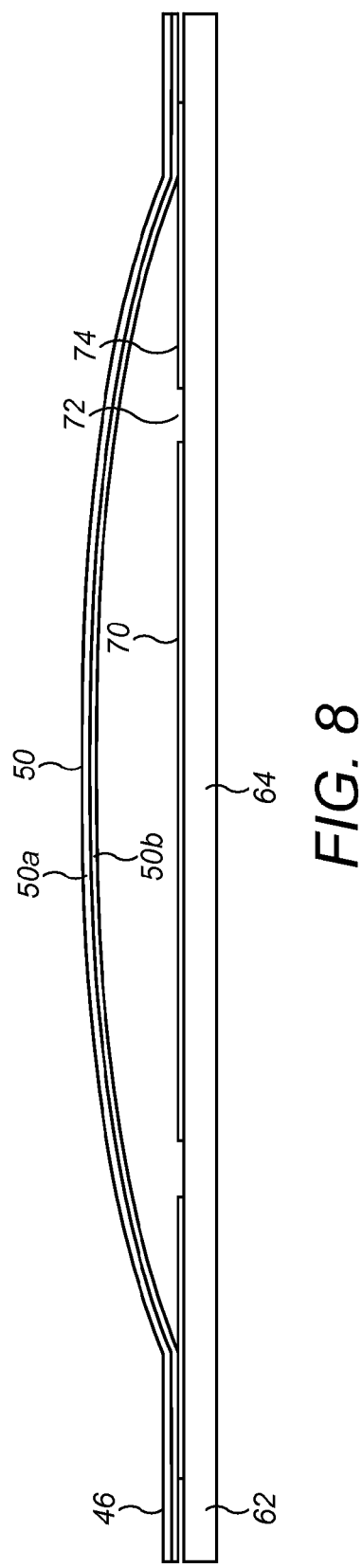
FIG. 8 is a section through a respective dome switch and underlying switch node of the mobile communication device.

The basic housing body 42 also comprises two-parts, namely a base 60 and a printed circuit board 62. The printed circuit board is best seen in FIGS. 4 and 5, and comprises on one face a matrix array of switch nodes 64, comprising 3 columns and 5 rows of such switch nodes 64 arranged to be aligned with the domed switch elements 50 and associated keys 16, 18, 20. Additionally, the printed circuit board 62 includes a speaker slot 66 and an LED window 68, corresponding respectively to the speaker slot 22 and the LED window 24. As shown in FIGS. 4 and 8, each switch node 64 is formed from a metalized film deposited on the surface of the printed circuit board and comprises an inner metallic dot or circular spot 70 surrounded by an annular insulating gap 72 and a metallic outer annular strip 74. Depression of any one of the domed switch elements 50 brings the metallised undersurface of the dome switch 50 into contact with both the metallic dot 70 and the metallic annular strip 74 and provides a bridge across the annular gap 72 to close the switch provided by the switch node 64.

All of the circuit elements of the mobile communication device are mounted on a rear surface 76 of the printed circuit board 62, and include a power supply or battery 78, an operating switch 80 arranged to switch on the battery 78, a micro USB socket 81 for plugging in a battery charger, and an LED 82 mounted behind the window 68 and arranged to be illuminated when the battery 78 is switched on. The circuit elements further include a speaker 84 mounted behind the opening 66, an antenna 86, a control circuit 88, and a microphone 90. The control circuit 88 is adapted selectively to enable and render active, or to leave inactive, each respective switch node 64, as will be further described below. Finally, the printed circuit board 62 includes a socket 91 for a SIM card.

The housing base 60 is arranged to receive the printed circuit board 62 as a front wall of the housing 12. The base 60 itself comprises a base or rear wall 100 having a strengthened sidewall 102. In order to keep the housing 12 as slim as possible, the base wall 100 is very thin, and therefore additional reinforcement is provided by two transverse bracing walls 104, 106 and by a series of bracing ribs 108 extending inwardly from the sidewall 102. Additional structural reinforcement is provided by 4 bracing columns 110 formed at each corner of the base wall 100 to receive connecting screws 112 extending through the printed circuit board 62 for mounting the printed circuit board 62 on the housing base 60.

The housing base 60 further includes a number of openings, including an opening 114 for the operating switch 76, as well as an opening 116 for the USB socket 81 for receiving the plug in power connector for charging the battery 78, an opening 118 for the microphone 90, and an access port 120 for a transceiver connector to test the antenna performance during manufacture. The port 120 is sealed up for use. Finally, the housing base 60 also has the opening 30 for receiving the SIM card hatch 32. For this purpose, the opening 30 is recessed relative to the external surface 26 of the base wall 100 and is defined by an upstanding wall 122 on an inner surface 124 of the base wall 100. The upstanding wall 122 surrounds the opening 30 and contains a pair of notches 126 for receiving a corresponding pair of resiliently deflectable lugs 128 formed on the SIM card hatch 32. The SIM card hatch 32 can thus be prized out of the opening 30 for the purpose of inserting a SIM card and fitting it to the circuit board 62, and thereafter can be snap-fitted back in the opening 30 to close the opening 30.

The control circuit 88 will now be described further with reference to FIG. 9, which is a circuit diagram of the main circuit elements employed in the mobile communications device. As shown, the control circuit 88 comprises a processor 92 having pairs of connecting leads 94 respectively connected to each of the switch nodes 64 on the printed circuit board 62. Thus, one lead in each pair 94 is connected to the central metallic dot 70 and the other lead in each pair 94 is connected to the surrounding metallic annular strip 74. The processor 92 is pre-programmed, or is programmable, to enable or form active connections with any selected one or more of the pairs of connecting leads 94, thereby selectively to enable and render active, or to leave inactive, each respective switch node 64. Accordingly, the processor 92 enables those switch nodes 64 required by any selected keypad 48.

The control circuit 88 further includes a circuit 140 connected between the processor 92 and the speaker 84 for digital to analogue conversion of output signals supplied from the processor 92 to the speaker 84, and between the microphone 90 and the processor 92 for analogue to digital conversion of signals from the microphone 90 to the processor 92. Additionally, a transceiver circuit 142 including an RF control unit 144 is connected to the antenna 86 for transmitting and receiving GSM signals. A power management unit 146 is also included and is connected respectively to the battery 78 by way of the slide switch 80 and to the USB socket 81. Furthermore, in use, a SIM card 148 is provided, and will be inserted in the SIM card socket 91.

Having thus described the keypad arrangement and functional operation of one particular form of mobile communication device according to the invention, an important characteristic, which is the modular design of the keypad assembly, will now be described with reference to FIG. 10, which shows three different versions of the keypad assembly 40, with corresponding different adhesive rear labels 44. Firstly, in FIG. 10*a*, the keypad layout of FIG. 1 is shown and employs a keypad layer 48*a* as described with reference to FIG. 3. This arrangement permits the mobile communication device to be employed as a standard mobile cell phone and accordingly a respective rear label 44*a* includes a memo portion 440 for inserting a plurality of significant contact numbers.

Turning to FIG. 10*b*, an alternative keypad layout is shown, which makes use of a keypad assembly 40*b* having a modified layout for the switch elements 50 and keys 16, 18, 20. As shown in FIG. 10*b*, a keypad layer 48*b* still includes the speaker slot 22 and LED window 24, as well as the volume keys 16. Three function keys 18 are also included, respectively for initiating and terminating communications and for providing a top-up function. The main difference in the present instance is that there are only four alphanumeric keys 20, each associated with a respective fixed contact number and having associated therewith on the keypad layer 48*b* a respective name label 200 for the contact name. A plain rear label 44*b* is employed for simplicity.

In this example, it is envisaged that the processor 92 will be programmed or programmable to enable or activate the switch nodes 64 corresponding to the volume keys 16 as well as the switch nodes 64 in the top row and the left hand column of the matrix of such nodes, as viewed from the front of the printed circuit board 62, corresponding to the function keys 18 and the 4 alphanumeric keys 20. The remaining switch nodes 64 will not be enabled or activated by the processor 92 and will therefore remain inactive. Furthermore, it is envisaged that the processor 92 will be programmed or programmable with a selected series of four fixed contact numbers, each of which can be accessed by a respective one of the keys 20.

Accordingly, in this example, the mobile communication device will be capable of communicating freely with the four fixed contact numbers but with no others. Such a communication device may, for example, find particular application for family use and be programmed with contact numbers for mother, father, and two other significant individuals and be issued to a child for their use. Although the range of communication possibilities is restricted with this example, nonetheless it offers the important advantage of added security and reassurance between parent and child, as well as control of mobile phone usage.

Turning to the example in FIG. 10*c*, it can be seen that in this instance the keypad layout includes the volume keys 16 as before but the function and contact keys 18, 20 have been replaced by a single column of contact keys 20 representing access to specific services. Thus, five contact keys 20 are arranged vertically along the centre of the keypad layer 48*c* to be aligned with the five switch elements 50 forming the central column of the matrix array of switch nodes 64 on the printed circuit board 62. Again, a plain rear label 44*c* is employed for simplicity.

In this instance, the processor 92 is programmed or programmable to enable and activate the two switch nodes 64 associated with the volume keys 16 and the five switch nodes 64 associated with the central column of the matrix array. All of the remaining switch nodes will remain inert and inactive. Furthermore, the processor 92 will be programmed or programmable with the contact numbers for the five selected services, which in this instance are, respectively, directory enquiries, emergency services, a taxi service, weather report and road side assistance. Depression of any one of the keys 20 will initiate contact with the associated service. A second depression subsequently will terminate such contact.

In each of the examples of FIGS. 10*b* and 10*c*, a standard basic rear label 44 is provided, which is plain apart from instructions for the on/off switch 34, but alternative designs are also possible.

As will be understood from FIG. 10, the present invention envisages a modular series of components for different keypad assemblies 40, depending upon the desired operating function for the mobile communication device. In each instance, such series of components includes an associated pair, provided by the switch layer 46 and the keypad layer 48, which will be of matching functional design. Furthermore, in every instance, a common printed circuit board design is employed having the same matrix array of switch nodes 64; however, the processor 92 enables and activates only those switch nodes 64 relevant to the chosen keypad layout.

It will be appreciated that the invention has various very significant advantages, in that a standard housing and control circuit design is employed with a modular series of simple additional components in the form of the switch layer 46 and the keypad layer 48. Such switch layer 46 and keypad layer 48 are of simple design and construction, and any number of different layouts can readily be produced to provide a full set of possibilities. Then, when a mobile communication device is purchased or ordered for a particular functional operation, all that is required is to select the appropriate pair of components comprising the switch layer 46 and the keypad layer 48, and to programme the processor 92 accordingly.

Figure 11:
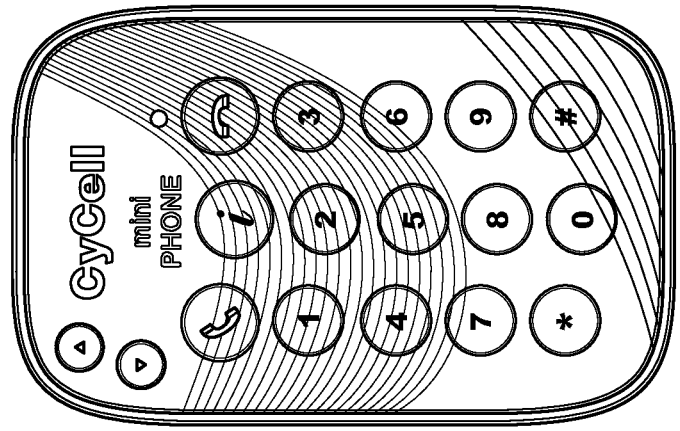
FIG. 11 shows a series of front views of one example of mobile communication device, including a peelable front layer providing a first keypad layout having a second keypad layer underneath providing a different keypad layout.
Figure 11:
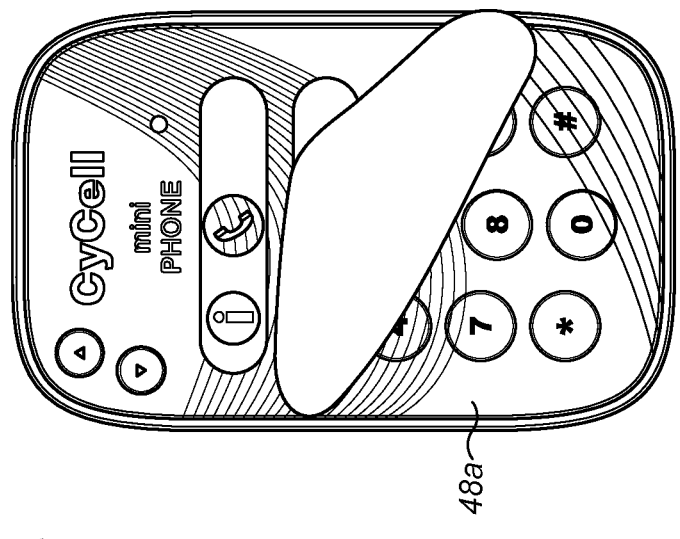
Figure 11:
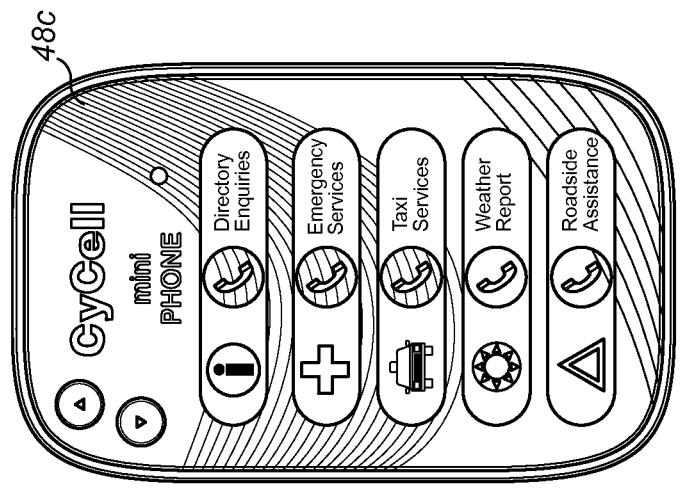

A further possibility is shown in FIG. 11, in which a mobile communication device according to FIG. 10*c*, purchased for communication with various useful services, can be modified to produce a mobile communication device according to FIG. 10*a* capable of standard mobile communication functions. This is achieved by employing two keypad layers 48*a*, 48*c* with the standard numerical keypad layer 48*a* adhered directly to the switch layer 46 and with the service keypad layer 48*c* adhered on top of the numerical keypad layer. In the event that the user wishes to change the function of the mobile communication device all that is required is to peel off the outermost keypad layer 48*c* to expose the numerical keypad layer 48*a*. In order to avoid the need for reprogramming, the switch nodes 64 are set up for standard mobile communication functions. Services would be called with a long key press and the numerical keys would be operated with a short key press for standard communications. The service keys would thus double as numerical keys. Instructions provided on the service keypad layer would ask the user to hold the service keys down for an extended time to call the respective service.

Figure 12:
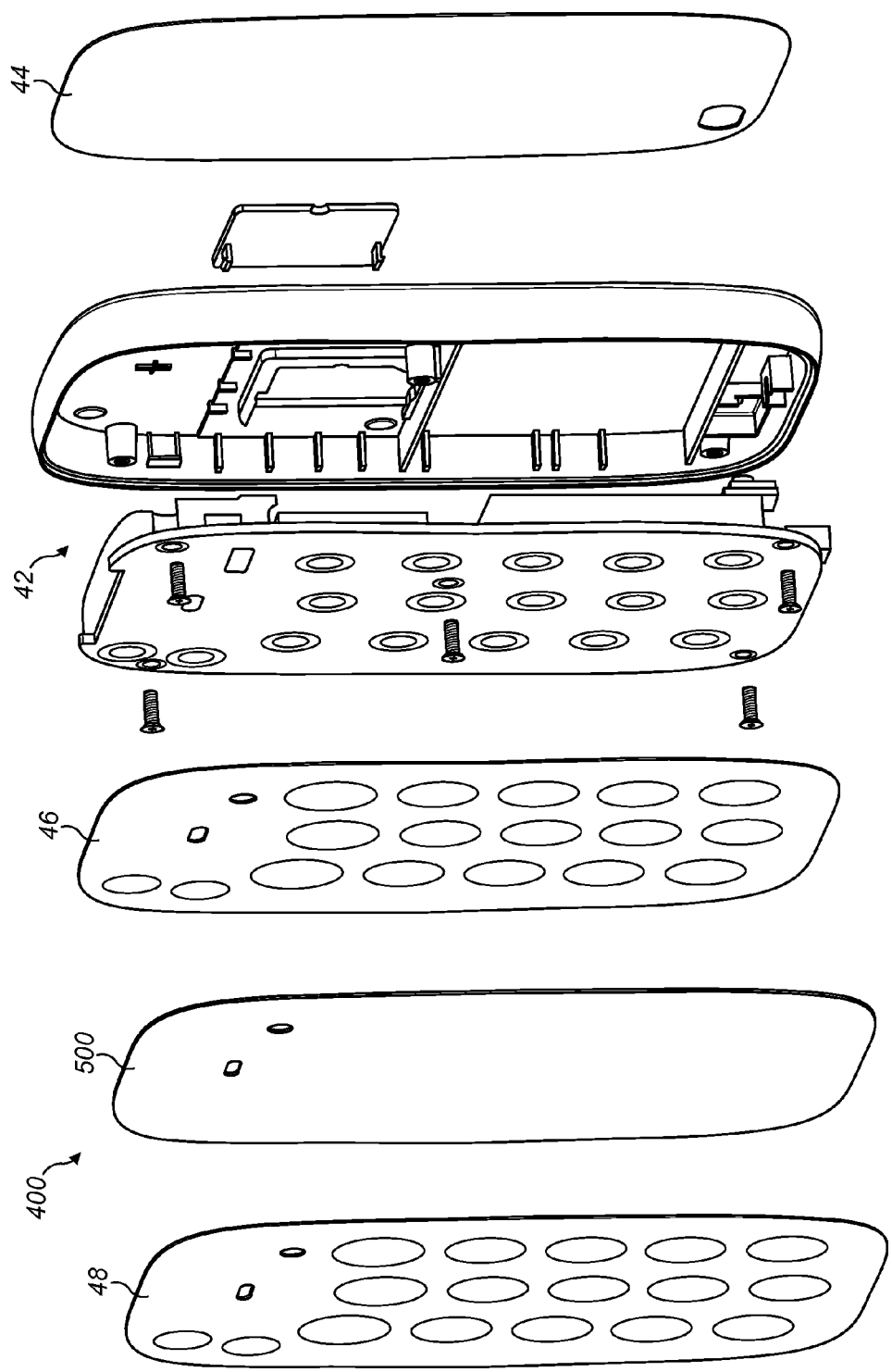
FIG. 12 is an exploded view of a further embodiment of the mobile communication device, corresponding to FIG. 3.

Referring now to FIGS. 12 to 15, a further embodiment of the mobile communication will be described. FIG. 12 is an exploded view of this further embodiment, and is similar to FIG. 3 but showing a modification of the keypad assembly 40 of FIG. 3. Like parts are designated by the same reference numerals, and will not be described further. Only the modified features will be described.

Figure 13:
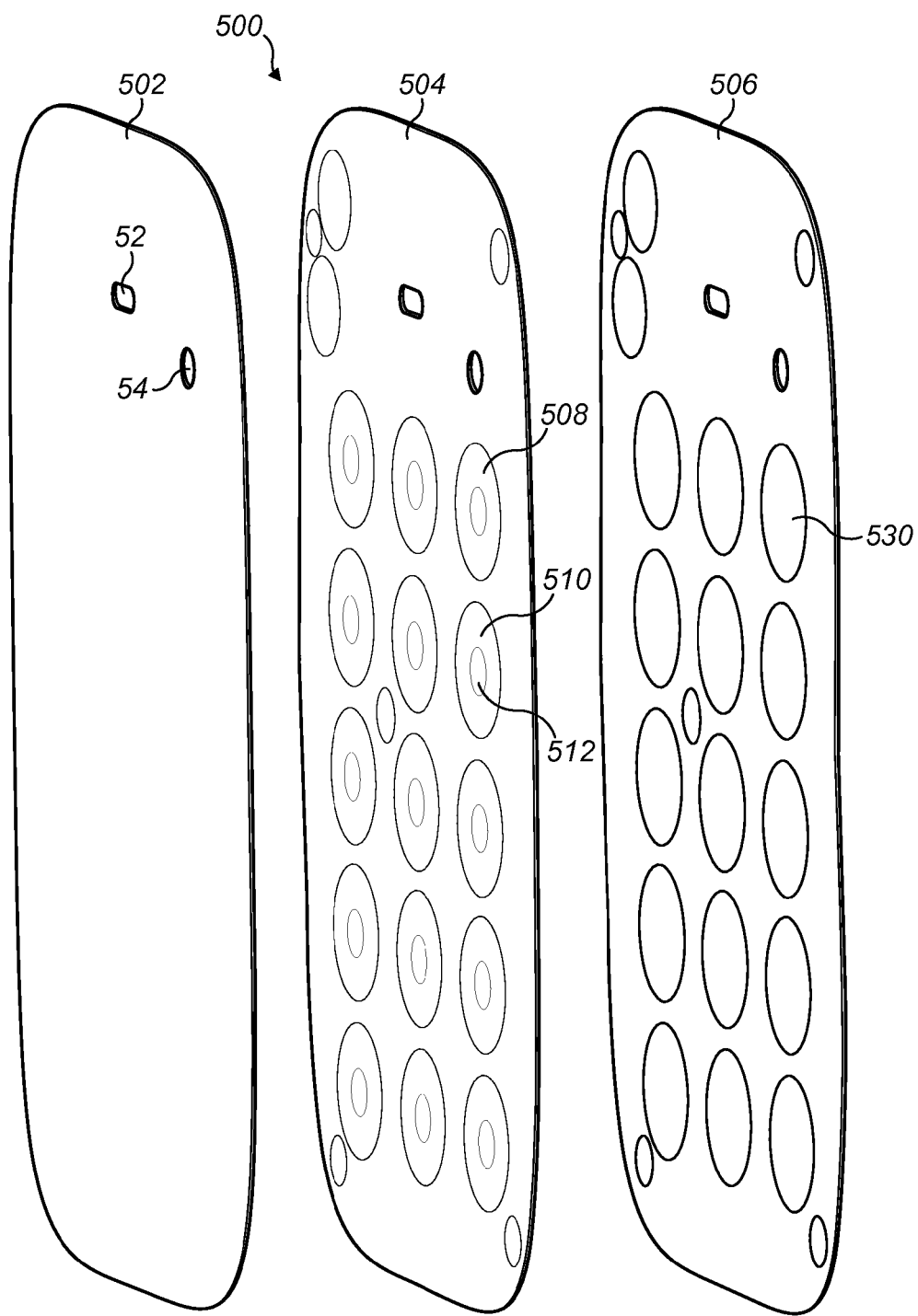
FIG. 13 is an exploded view of a middle support layer of a keypad assembly of the further embodiment.
Figure 14:
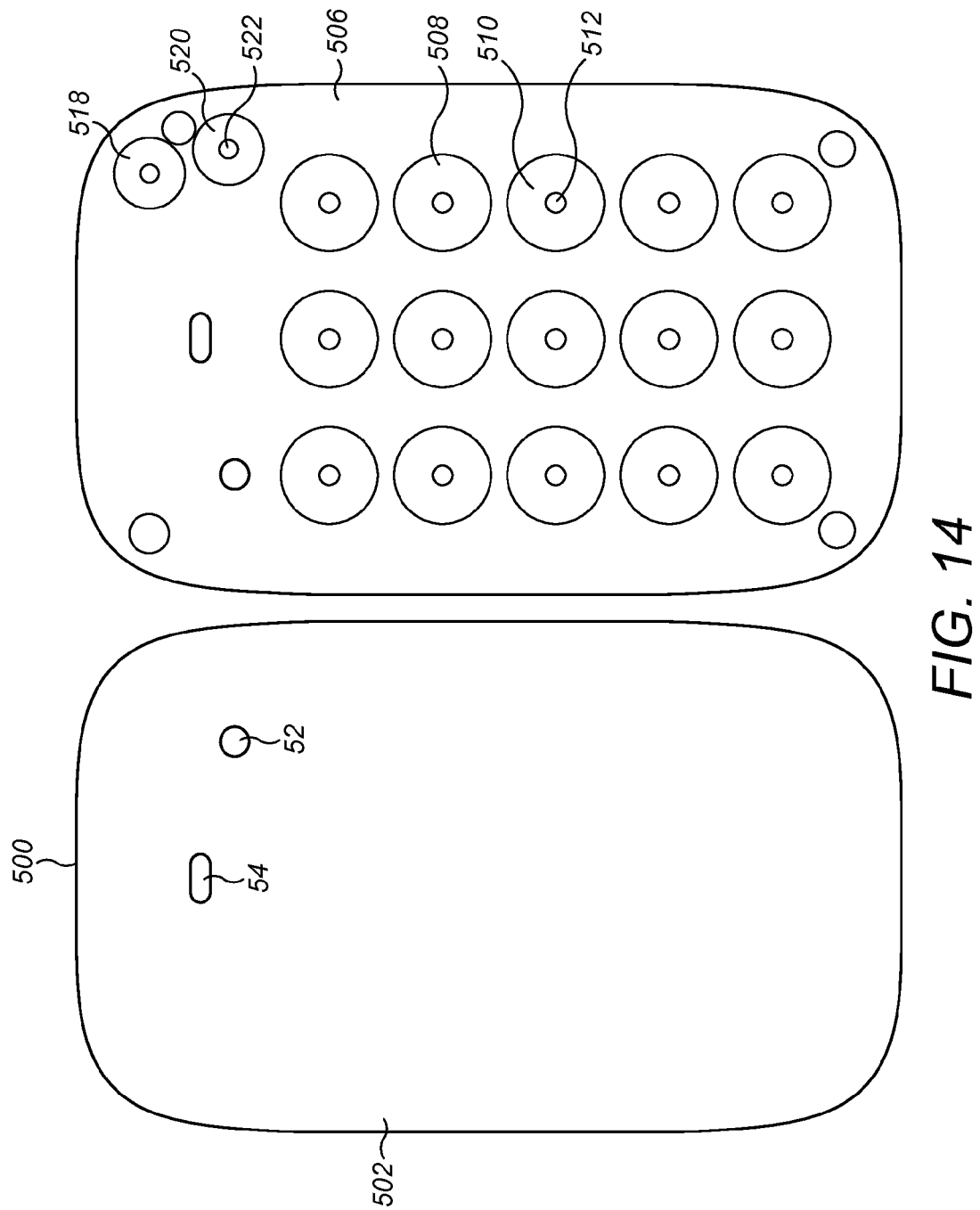
FIG. 14 shows front and rear views, respectively, of the middle support layer of the keypad assembly illustrated in FIG. 13.

In the further embodiment of FIGS. 12 to 15, a keypad assembly 400 comprises three layers, namely a switch layer 46, as before, an outer keypad display layer 48, as before, and a middle support layer 500. The middle support layer 500 is very important, and is itself of multi-layer construction as shown in FIG. 13. Essentially, the middle support layer 500 has a two-fold function, namely to provide a smooth flat surface for mounting the keypad display layer 48 on the one hand, and to ensure effective key operation on the other hand.

This is achieved by forming the middle support layer 500 from three layers 502, 504 and 506 as illustrated in FIG. 13.

The layer 502 is formed from a stiff but flexible plastics sheet made of polyester having a smooth flat surface on each face to allow for easy attachment of the layers 504, 506 and of the keypad display layer 48. The sheet 502 has a speaker slot 52 and an LED window 54 as in the embodiment illustrated in FIG. 3, and corresponding openings are also provided in the layers 504 and 506. Apart from the slot 52 and the window 54, the sheet 502 carries no markings, so that it offers an entirely smooth surface for supporting the keypad display layer 48.

The layer 504 is a thin flexible silicon layer, which may be transparent and which is affixed to the rear surface of the sheet 502. The silicon layer 504 is formed on its rear surface remote from the sheet 502 with a series of circular recesses 508 corresponding in shape, size and position to the domed switch elements 50 of the switch layer 46. Each circular recess 508 effectively comprises a recessed annular surface 510 set back from the plane of the rear surface of the silicon layer 504, and a raised central dot 512 positioned to overlie the top of the domed switch element 50. The central dots 510 constitute activation elements, as described below. Although the recessing of the annular surfaces 510 and the raising of the central dots 512 are present on the surface of the silicon layer 504 which is on the rear side with respect to FIG. 13, nonetheless the pattern can be seen in FIG. 13, because the silicon layer 504 is transparent. Additionally, the silicon layer 504 has similarly recessed elements 518, with recessed annular surfaces 520 and central dots 522, in a location corresponding with the volume keys 16.

Finally, the layer 506 is a layer of adhesive arranged to overlie and contact only those regions of the switch layer 46 and the silicon layer 504 which are not occupied by the domed switch elements 50 and the corresponding recessed areas 508 with the activation dots 512. The adhesive layer 506, therefore, has a pattern of circular openings 530 arranged to fit snugly round and receive the domed switch elements 50.

Figure 15:
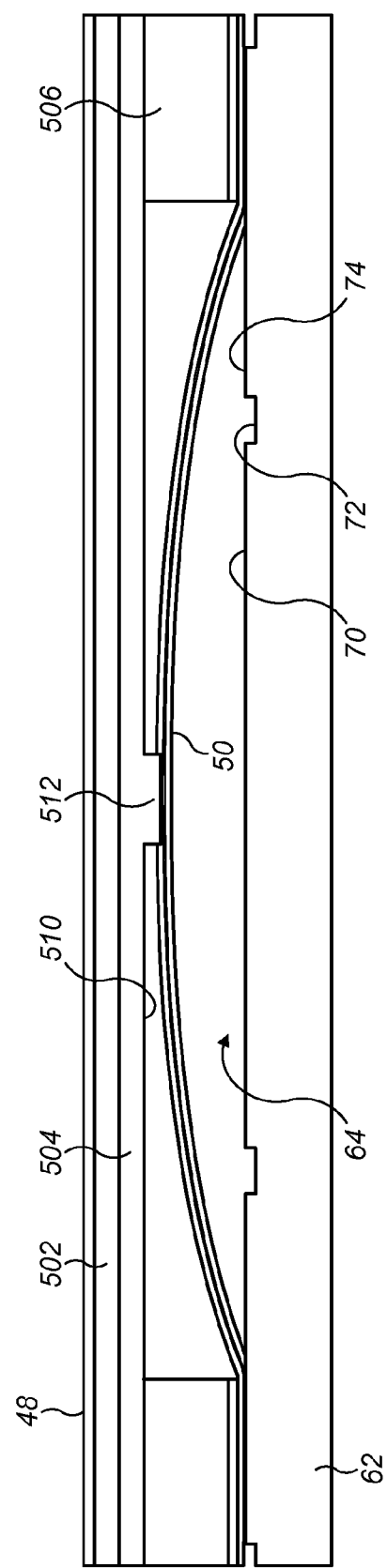
FIG. 15 is a section through the middle support layer of the keypad assembly and a respective dome switch and underlying switch node of the further embodiment, corresponding to FIG. 8.

The effect of the silicon layer 504 and the adhesive layer 506, best seen in FIG. 15, is thus to ensure that the plastics layer 502 lies completely flat over the domed switch elements 50, while the activation dots or elements 512 are precisely aligned, and in contact, with the tops of the domed switch elements 50, so that each switch element 50 may be precisely and effectively actuated by light but firm finger pressure on the associated key element on the keypad display layer 48.

The embodiment shown in FIGS. 12 to 15 has considerable advantages in ensuring effective key operation with a professional finish. In addition, the construction of this embodiment means that the mobile communication device is completely customisable without the need for disassembly. The only actions required to create a new or modified mobile communication device from a basic original or previous version are: firstly, the programming or reprogramming of the processor according to the desired keypad layout, in order to render active the corresponding one or ones amongst the metallic switch nodes 64; and, secondly, the mounting of a suitable keypad display layer 48 on the outer surface of the plastics sheet 502, such keypad display layer being provided with a keypad layout as desired. This is a very important advantage in terms of versatility and ease of use.

Figure 9:
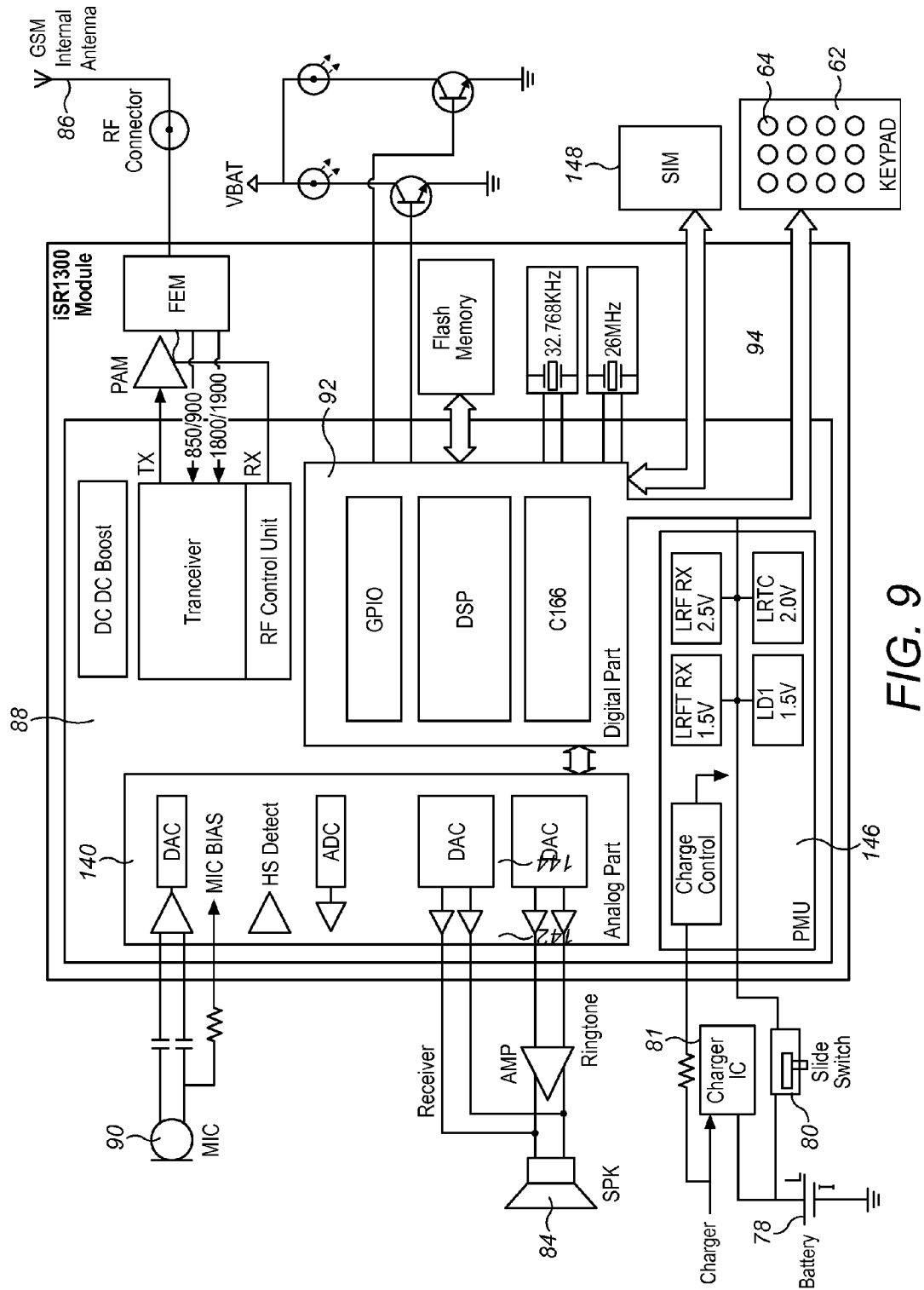
FIG. 9 is a circuit diagram showing the basic circuit elements of the mobile communication device.
Figure 16:
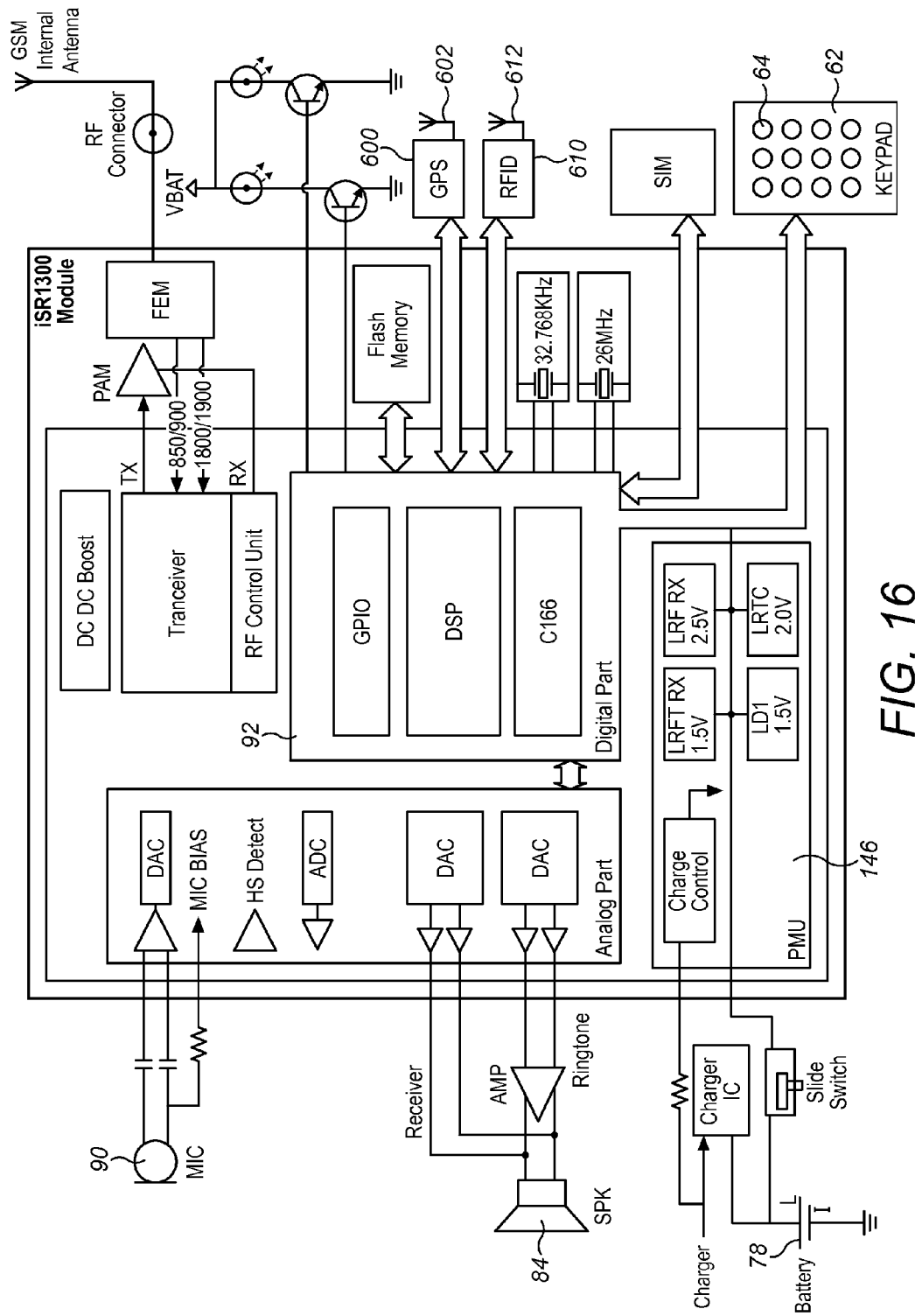
FIG. 16 is a circuit diagram, corresponding to FIG. 9, showing the basic circuit elements of another embodiment of the mobile communication device, including some additional circuit elements.
Figure 17:
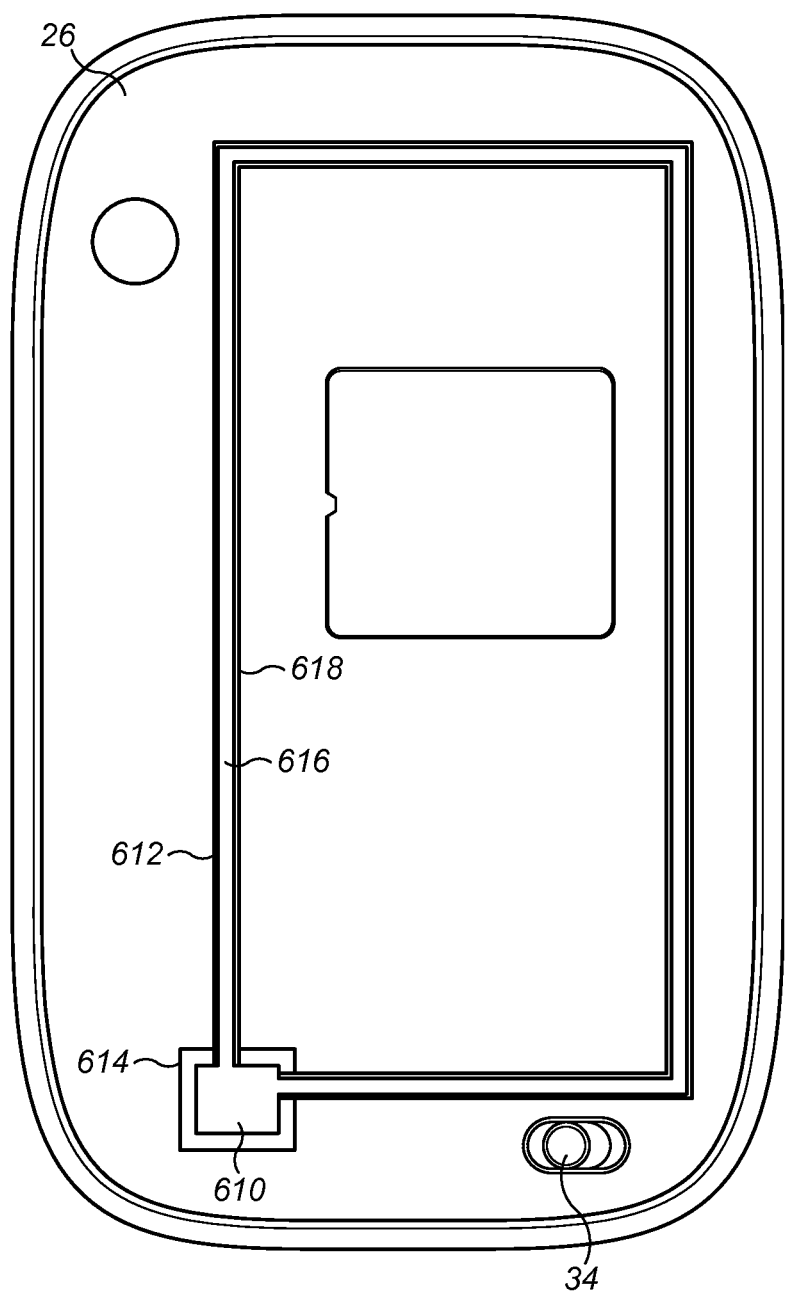
FIG. 17 is a rear view of the mobile communication device of FIG. 16 in which the device has been modified to carry an RFID element and antenna.

Another variation is illustrated in FIGS. 16 and 17, which are respectively a modified circuit diagram based on FIG. 9 for another embodiment of mobile communication device, and a rear view of the mobile communication device. Like parts are indicated by the same reference numerals and are described above and will therefore not be further discussed. Only the variations will be described.

Referring now to FIG. 16, this shows the control circuit 88, as in the case of FIG. 9, comprising as before a processor 92 connected to a power management unit 146 and thence to the battery 78, and further connected respectively to the switch nodes 64 on the printed circuit board 62, the speaker 84, and the microphone 90. In the present embodiment, the processor 92 is further connected respectively to a global positioning system (GPS) transceiver 600 and associated antenna 602 and to a radio frequency identification (RFID) element 610 and associated receiver/antenna 612. The GPS transceiver 600 enables communication with the GPS satellite system for the provision of highly reliable location and time information to the mobile communication device. The RFID element 610 maybe employed for identification purposes, for example for entering secure buildings or for monitoring site entry in the case of controlled areas of industrial plant, business facilities etc.

In the present instance, the RFID element 610 is powered by the battery 78 of the mobile communication device and is physically mounted in the rear face 26 of the mobile communication device to be flush with the outer surface of the device, as shown in FIG. 17. The RFID element 610 is inset into a rectangular recess 614 in the rear face 26 at a position near one corner facing the on/off power switch 34. The antenna 612 is in the form of a rectangular loop 616 also inset into the rear face 26 of the mobile communication device in a rectangular channel 618, as shown. By insetting the RFID element 610 and antenna 612 in this fashion, the rear face 26 can be presented as a flat surface for receiving a label over the RFID element 610 and antenna 612, thereby concealing their presence.

In a further modification, the RFID element 610 and antenna 612 may simply be inset into the rear face 26 but without being connected to the battery 78 of the mobile communication device, and may effectively be passive elements, simply requiring an external electromagnetic field for activation for identification purposes.

Various other modifications are possible within the scope of the present invention, and different keypad layouts are also envisaged. The design of the basic matrix array of switch nodes 64 on the printed circuit board 62 may be varied as desired, and this will determine the number and range of possibilities for the keypad layout. Furthermore, the specific design of each switch node 64 may be varied, and the described button design may be replaced by first and second metallic bar elements separated by a straight insulating gap. In this instance, each switch element may comprise a simple arced conductive bar arranged on the switch layer 46 at right angles to the bars of the switch nodes 64 and resiliently depressible to contact the two metallic bars across the insulating gap.

It is to be appreciated that the construction of the housing of the present mobile communication device, in order to provide a compact structure with all the circuit elements arranged between the printed circuit board 62 and the housing base 60, is another significant advantage.

The invention claimed is:

1. A mobile communication device comprising a handset having a transmitter; a control circuit for controlling mobile communications via the transmitter, the control circuit including a processor; and a customisable keypad arrangement including at least one key for initiating mobile communications, the keypad arrangement comprising a board having on one surface an array of metallic switch nodes respectively capable of being rendered active or inactive according to an output of the processor, the processor being programmable or programmed in dependence upon a desired keypad layout to render active a selected one or ones amongst the metallic switch nodes, and a keypad assembly mounted on the board and provided with at least one switch element situated to overlie the said selected metallic switch node(s) and operable by said at least one key for initiating mobile communications.

2. A device according to claim 1 wherein the keypad assembly comprises a switch layer carrying a plurality of switches overlying a selected plurality of metallic switch nodes, and a keypad layer including a corresponding plurality of keys arranged to overlie the selected plurality of metallic switch nodes.

3. A device according to claim 2 having a modular design and comprising a series of switch layers and/or keypad layers selectable according to the desired keypad layout.

4. A device according to claim 1 having a plurality of templates for the keypad assembly, which are respectively selectable according to the desired keypad layout.

5. A device according to claim 1, in which each metallic switch node comprises first and second metallic elements separated by an insulating gap and wherein each switch element comprises a resiliently depressible conductive member arranged when depressed by manual pressure to connect the two metallic elements.

6. A device according to claim 5 wherein the first element is a metallic dot, the second element is a metallic ring surrounding said metallic dot, and the conductive member is a domed plate.

7. A device according to claim 1 wherein the handset comprises a housing having a base wall and a side wall, the side wall supporting the board as a front wall, and wherein the transmitter and the control circuit are situated between the front wall and the base wall.

8. A device according to claim 7 wherein the side wall is reinforced and the housing has at least one internal bracing element for structural purposes.

9. A device according to claim 8 in which the internal bracing element comprises at least one of a central partition extending between opposed regions of the side wall, a bracing rib extending inwardly from the side wall, and a bracing column extending from one of the front wall and the base wall towards the other of the front wall and the base wall for receiving a connecting screw.

10. A device according to claim 7 in which the housing further comprises a subscriber identity module (SIM) card opening and a SIM hatch received in the opening, wherein the opening is recessed into the base wall of the housing and is defined by an upstanding wall surrounding the opening on an internal surface of the base wall, the upstanding wall having a pair of notches therein, and wherein the SIM hatch is formed with a pair of resiliently deflectable lugs having outwardly projecting ears receivable in the notches.

11. A device according to claim 7 in which at least one of the front wall and the base wall of the housing is formed with an externally upstanding periphery so that an adhesive layer applied over said wall lies flush with the said periphery.

12. A device according to claim 11 wherein the adhesive layer comprises one of the keypad assembly and a label.

13. A device according to claim 1 further including at least one contact programmed into the processor, and wherein operation of the said at least one key operated switch initiates a mobile communication to said at least one contact.

14. A device according to claim 1 further including a receiver.

15. A device according to claim 2 wherein the keypad assembly further comprises a middle support layer situated between the switch layer and the keypad layer, the middle support layer comprising activation means arranged to overlie the metallic switch nodes, and backing means providing a smooth surface for receiving the keypad layer.

16. A device according to claim 15 wherein the activation means each comprise a recessed annular surface having a raised central activation dot, wherein the metallic switch nodes each comprise a domed switch element, and wherein the raised activation dot is aligned with the top of the domed switch element.

17. A device according to claim 1 further including at least one of a global positioning system device and a radio frequency identification device.

18. A mobile communication device comprising a handset having a transmitter; a control circuit for controlling mobile communications via the transmitter, the control circuit including a processor; and a customisable keypad arrangement for activating the transmitter, the keypad arrangement comprising a board having on one surface an array of metallic switch nodes selectively capable of being rendered active or inactive according to an output of the processor, and a keypad assembly mounted on the board and provided with an array of switch elements arranged respectively to overlie said metallic switch nodes, the keypad assembly further comprising a keypad layer carrying at least one key situated to overlie at least one selected said metallic switch node and corresponding switch element and operable for initiating mobile communications.

* * * * *